United States Patent
McKeon et al.

[11] Patent Number: 5,854,422
[45] Date of Patent: Dec. 29, 1998

[54] ULTRASONIC DETECTOR

[75] Inventors: R. Clayton McKeon, Holland; Melvin F. Clouse, Hudsonville, both of Mich.

[73] Assignee: K-Line Industries, Inc., Holland, Mich.

[21] Appl. No.: 889,979

[22] Filed: Jul. 10, 1997

Related U.S. Application Data

[60] Provisional application No. 60/021,441, Jul. 10, 1996.
[51] Int. Cl.$^6$ .................. G01M 03/20; G01M 03/24; G01N 21/17
[52] U.S. Cl. .................. 73/49.2; 73/40.5 A; 73/592
[58] Field of Search .................. 73/49.2, 40.5 A, 73/592

[56] References Cited

U.S. PATENT DOCUMENTS

| | | | |
|---|---|---|---|
| Re. 33,977 | 6/1992 | Goodman et al. | 73/40.5 A |
| 3,575,040 | 4/1971 | Bosselaar | 73/40.5 |
| 3,592,967 | 7/1971 | Harris | 179/1 A |
| 3,814,207 | 6/1974 | Kusuda et al. | 181/5 LD |
| 3,925,666 | 12/1975 | Allan et al. | 250/338 |
| 3,930,556 | 1/1976 | Kusuda et al. | 181/0.5 |
| 4,012,944 | 3/1977 | Covington et al. | 73/40.5 R |
| 4,075,601 | 2/1978 | Flournoy | 340/15 |
| 4,176,543 | 12/1979 | Nolte et al. | 73/40.5 A |
| 4,287,581 | 9/1981 | Neale, Sr. | 367/135 |
| 4,309,576 | 1/1982 | Corrigan | 179/110 A |
| 4,327,576 | 5/1982 | Dickey et al. | 73/40.5 A |
| 4,416,145 | 11/1983 | Goodman et al. | 73/40.5 A |
| 4,455,863 | 6/1984 | Huebler et al. | 73/40.5 A |
| 4,457,162 | 7/1984 | Rush et al. | 73/24 |
| 4,555,627 | 11/1985 | McRae, Jr. | 250/334 |
| 4,635,042 | 1/1987 | Andrews | 340/605 |
| 4,640,121 | 2/1987 | Leuker et al. | 73/40.5 A |
| 4,772,789 | 9/1988 | Maram et al. | 250/330 |
| 4,785,659 | 11/1988 | Rose et al. | 73/40.5 A |
| 4,823,600 | 4/1989 | Biegel et al. | 73/592 |
| 4,979,820 | 12/1990 | Shakkottai et al. | 356/129 |
| 4,987,769 | 1/1991 | Peacock et al. | 73/49.7 |
| 5,089,997 | 2/1992 | Pecukonis | 367/135 |
| 5,125,925 | 6/1992 | Lundahl | 606/15 |
| 5,161,408 | 11/1992 | McRae et al. | 73/40.7 |
| 5,349,568 | 9/1994 | Kupperman et al. | 367/125 |
| 5,417,113 | 5/1995 | Hartley | 73/587 |
| 5,606,974 | 3/1997 | Castellano et al. | 128/662.06 |

*Primary Examiner*—Hezron Williams
*Assistant Examiner*—J. David Wiggins
*Attorney, Agent, or Firm*—Price, Heneveld, Cooper, DeWitt & Litton

[57] ABSTRACT

An ultrasonic detector of the present invention includes an ultrasonic transducer for detecting ultrasonic energy and generating an electrical signal having an amplitude corresponding to the detected level of the received ultrasonic energy, and a light source supported in proximity to the ultrasonic transducer for illuminating an area from which the ultrasonic transducer may detect ultrasonic energy. Preferably, the light source is a directional light source positioned such that an optical axis of a light beam emitted from the light source intersects a directional axis of the ultrasonic transducer at a predetermined distance from the ultrasonic transducer. The ultrasonic detector of the present invention also preferably includes an indicator light coupled to the ultrasonic transducer for receiving the electrical signal output from the transducer and for indicating the relative amplitude of ultrasonic energy received by the transducer.

14 Claims, 2 Drawing Sheets

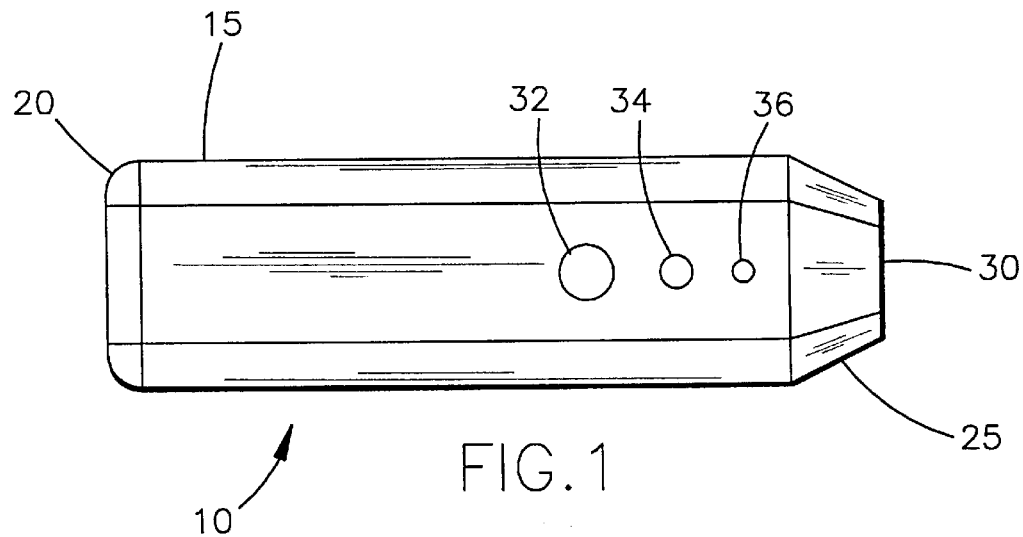
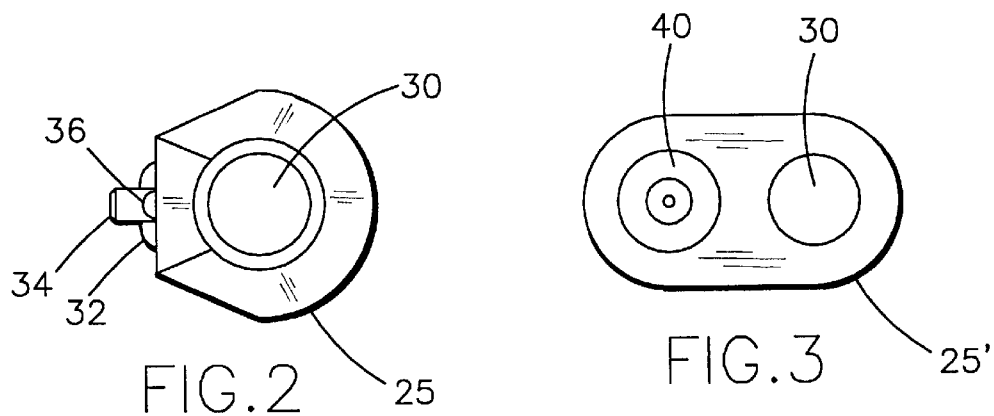
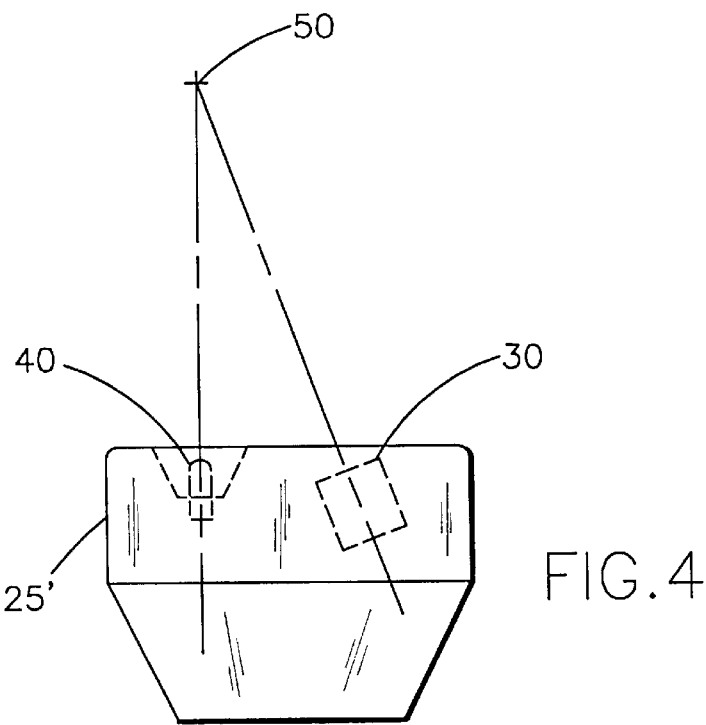

ULTRASONIC DETECTOR

CROSS-REFERENCE TO RELATED APPLICATION

This application claims priority under 35 U.S.C. §119(e) on U.S. Provisional Application No. 60/021,441 entitled "ULTRASONIC LEAK DETECTOR" filed on Jul. 10, 1996, by R. Clayton McKeon and Melvin F. Clouse, the entire disclosure of which is incorporated by reference herein.

BACKGROUND OF THE INVENTION

The present invention generally relates to ultrasonic detectors. More particularly, the present invention relates to ultrasonic detectors used for detecting leaks in pressurized or vacuum lines and containers.

Conventional ultrasonic detectors used for detecting leaks have typically provided an audio output signal to allow users to effectively hear the received ultrasonic energy by listening to a beat frequency which is within the audible range and varies in frequency based upon the frequency of the received ultrasonic energy. Such detectors utilize an internal oscillator to create the beat frequency by mixing its output with the output from the ultrasonic transducer. Conventional ultrasonic detectors also typically include some form of visual indicator to provide a visual representation of the amplitude of the received ultrasonic energy. Thus, a user of a conventional ultrasonic detector may locate leaks based upon the visual indication as well as the tone and strength of the audible signal output from the detector. An example of such an ultrasonic detector is disclosed in U.S. Pat. No. 5,089,997 issued to Pecukonis.

Due to the presence of an internal oscillator used to create an audible beat frequency signal, conventional ultrasonic detectors may be relatively expensive. Further, due to the presence of ultrasonic background noise, a typical user of a conventional ultrasonic detector will obtain little advantage from listening to the change in tone of the audio signal output from these ultrasonic detectors. In addition, a leak that may be detected using one of these ultrasonic detectors may be extremely small and difficult to locate even with all this information provided to the user. Also, the line in which a leak exists may be in a poorly-illuminated location making it even more difficult to locate the leak.

SUMMARY OF THE INVENTION

Accordingly, the present invention has been made to overcome the above problems. One aspect of the present invention is to provide an ultrasonic leak detector that is both low in cost and effective for locating leaks. Another aspect of the present invention is to provide an ultrasonic leak detector that illuminates a small spot on the item being checked for leaks in the vicinity of the source from which ultrasonic energy is being detected by the ultrasonic transducer of the detector. Still another aspect of the present invention is to provide an ultrasonic detector having a built-in or attached illumination source for providing general illumination of the inspected item. Additional features and advantages of the invention will be set forth in part in the description which follows and in part will be apparent from the description, or may be learned by practice of the invention.

To achieve these and other aspects and advantages, and in accordance with the purpose of the invention as embodied and broadly described herein, the ultrasonic detector device of the present invention includes an ultrasonic transducer for detecting ultrasonic energy and generating an electrical signal having an amplitude corresponding to the detected level of the received ultrasonic energy, and a light source supported in proximity to the ultrasonic transducer for illuminating an area from which the ultrasonic transducer may detect ultrasonic energy. Preferably, the light source is a directional light source positioned such that an optical axis of a light beam emitted from the light source intersects a directional axis of the ultrasonic transducer at a predetermined distance from the ultrasonic transducer. Further, the ultrasonic detector device of the present invention preferably includes an indicator light coupled to the ultrasonic transducer for receiving the electrical signal output from the transducer and for indicating the relative amplitude of ultrasonic energy received by the ultrasonic transducer. A person using such an ultrasonic transducer would then move the transducer about the outer periphery of the pressurized line or container until the indicator light reaches its brightest intensity level. At this point, the directional light source would create a spot on the inspected line or container in which the leak may be found. The detecting device would also preferably include a housing in which the transducer indicator light and directional light source are disposed. Additionally, the ultrasonic detector of the present invention may include a squelch control for adjusting the gain of the signal output from the ultrasonic transducer to the indicator light.

These and other features, advantages, and objects of the present invention will be further understood and appreciated by those skilled in the art by reference to the following specification, claims, and appended drawings.

BRIEF DESCRIPTION OF THE DRAWINGS

The accompanying drawings, which are incorporated in, and constitute a part of, this specification, illustrate several embodiments of the invention and together with the description serve to explain the objects, advantages, and principles of the invention. In the drawings:

FIG. 1 is a top view of an ultrasonic detector constructed in accordance with the present invention;

FIG. 2 is an end view of the head of an ultrasonic detector constructed in accordance with a first embodiment of the present invention;

FIG. 3 is an end view of the head of an ultrasonic detector constructed in accordance with a second embodiment of the present invention;

FIG. 4 is a side view of the head of an ultrasonic detector constructed in accordance with the second embodiment of the present invention.

DETAILED DESCRIPTION OF THE PREFERRED EMBODIMENTS

Figure 5:
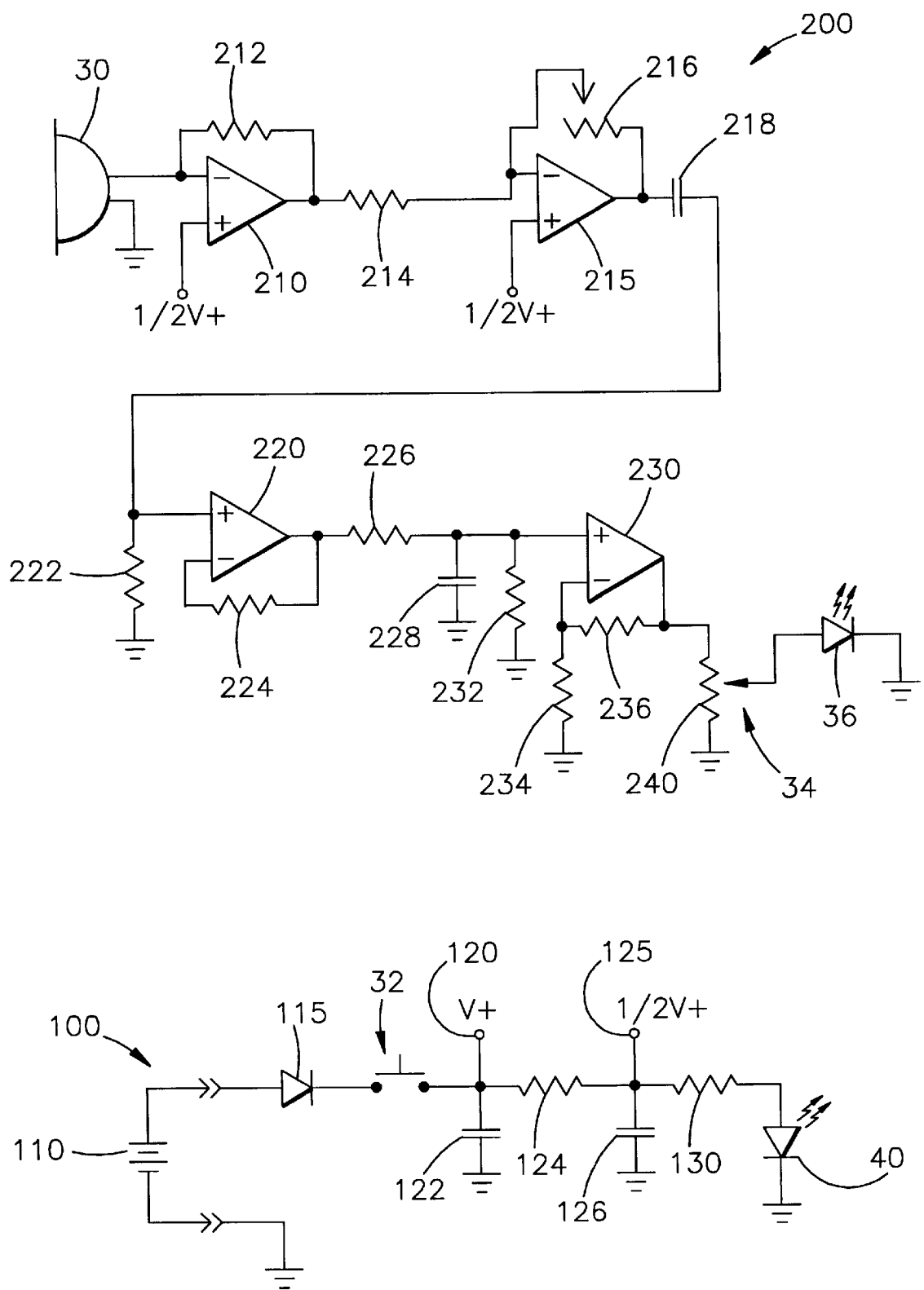
FIG. 5 is an electrical schematic illustrating the circuitry of an ultrasonic detector constructed in accordance with the present invention.

An ultrasonic detector constructed in accordance with a first embodiment of the present invention is shown in FIGS. 1 and 2. Ultrasonic detector 10 includes a main body housing 15 to which an end cap 20 may be removably engaged for insertion of a battery. Main body housing 15 also provides support for an on/off switch 32, a squelch control knob 34, and a indicating light 36, which may be a light emitting diode (LED). Ultrasonic detector 10 also includes a head portion 25 extending from main body housing 15 for supporting an ultrasonic transducer 30. Preferably, main body housing 15 is formed of a generally cylindrical shape with on/off switch 32, squelch control knob 34, and indicator light 36 disposed on an exterior circumferential surface of main body housing 15. Further, transducer 30 is preferably disposed substantially coaxially with main body housing 15.

FIGS. 3 and 4 illustrate a second embodiment of the present invention which differs from the first embodiment in that an illuminating light 40 is also provided in head 25' in order to illuminate an area corresponding to the detection range of transducer 30. As shown in FIG. 4, either transducer 30 or illuminating light 40, may be disposed in head 25' at an angle to the cylindrical axis of main body housing 15 so as to have their central axes intersect at a point 50 that is located a typical detecting distance from the end of head 25'. Illuminating light 40 is preferably an LED.

The electric circuitry of the ultrasonic detectors constructed according to the first and second embodiments is shown in FIG. 5 and described hereafter. The electrical circuit shown in FIG. 5 includes two portions—a power supply circuit 100 and a detection circuit 200. Power supply circuit 100 is adapted to be coupled to a 9-volt battery 110 so as connect to its negative terminal to a common ground and its positive terminal to the anode of a protection diode 115. The cathode of diode 115 is connected to a terminal of on/off switch 32 having its other terminal connected to a storage capacitor 122 (preferably 0.1 $\mu$F) and to one end of a resistor 124 (preferably 100 k$\Omega$). The other end of resistor 124 is connected to a second storage capacitor 126 (preferably 22 $\mu$F) and to one end of a resistor 130 (preferably 100 k$\Omega$). The other end of resistor 130 is connected to ground if the ultrasonic detector is constructed in accordance with the first embodiment, or connected to the anode of an LED serving as the illuminating light 40 if the ultrasonic detector is constructed in accordance with the second embodiment. Thus, as shown in FIG. 5, when on/off switch 32 is closed to turn on the ultrasonic detector, illuminating light 40 is turned on to illuminate a point on a surface corresponding to the point from which ultrasonic energy is being received by transducer 30.

In detection circuit 200, ultrasonic transducer 30 has one terminal connected to common ground and another terminal connected to the inverting input terminal of a first operational amplifier 210. The non-inverting input terminal of amplifier 210 is connected to terminal 125 of the power supply circuit to receive a reference voltage (½ V+) equal to the voltage across second storage capacitor 126. The output terminal of amplifier 210 is connected to its inverting input terminal via a feedback resistor 212 (preferably 300 k$\Omega$) and to the inverting input terminal of a second operational amplifier 215 via a resistor 214 (preferably 1.2 k$\Omega$) The non-inverting input terminal of amplifier 215 is also coupled to terminal 125 of power supply circuit 100 to receive the ½ V+ reference voltage. The output terminal of amplifier 215 is coupled to its non-inverting input terminal via a variable resistor 216 (preferably 250 k$\Omega$) and to the non-inverting input terminal of a third operational amplifier 220 via a capacitor 218 (preferably 0.1 $\mu$F). The non-inverting input terminal of amplifier 220 is also preferably connected to ground via a resistor 222 (preferably 390 k$\Omega$). The inverting input terminal of amplifier 220 is connected to the output terminal of amplifier 220 via a resistor 224 (preferably 100 k$\Omega$). The output terminal of amplifier 220 is also preferably connected to the non-inverting input terminal of a fourth operational amplifier 230 via a resistor 226 (preferably 27 k$\Omega$). The non-inverting input terminal of amplifier 230 is connected to ground via a capacitor 228 (preferably 0.1 $\mu$F) and also via a resistor 232 (preferably 27 k$\Omega$). The inverting input terminal of amplifier 230 is coupled to ground via a resistor 234 (preferably 10 k$\Omega$). The output terminal of amplifier 230 is connected to its inverting input terminal via a feedback resistor 236 (preferably 1000 k$\Omega$) and to the anode of an LED serving as indicating light 36. The cathode of LED 36 is connected to ground. Potentiometer 240, serving as the squelch control 34, may be connected between the output of amplifier 230 and illuminating light 36 in order to adjust the gain of the signal supplied to indicator light 36. Preferably, potentiometer 240 has a maximum resistance of 0.15 k$\Omega$. Operational amplifiers 210, 215, 220, and 230 are preferably packaged in a single integrated circuit to make the ultrasonic detector as compact as possible. Preferably, these operational amplifiers are those provided in integrated circuit part No. LM324. Further, amplifiers 210, 215, 220, and 230 may be provided power (V+) from power supply circuit 110 via a terminal 120, which is connected to storage capacitor 122.

In operation, transducer 30 supplies an electric signal to amplifier 210 having an amplitude that is proportional to the strength of any detected ultrasonic energy. Amplifiers 210, 215, 220, and 230 amplify and adjust the gain of the signal from transducer 30 and apply it to indicating light 36. The intensity of the light emitted from indicating light 36 varies in proportion to the strength of the ultrasonic energy received by transducer 30. By using an indicator light in this manner as the sole means for indicating the relative strength of the received ultrasonic energy, additional, complex, and expensive components may be eliminated.

When used in connection with illuminating light 40, the ultrasonic detector will indicate reception of the strongest ultrasonic energy when the directional axis of transducer 30 falls on the leak. Provided that the head 25 of ultrasonic detector is held at the proper distance from the item being inspected, a user may locate the leak within the light spot projected on the surface of the item by the illuminating light 40 when indicating light 36 is at its brightest intensity level. Thus, the ultrasonic detector of the present invention provides for efficient detection of leaks at a relatively low cost.

An additional advantage of providing illuminating light 40 in the ultrasonic detector of the present invention is that it provides general illumination in the area of the vessel under inspection. Thus, when the item under inspection is located in a poorly-illuminated area, the detector device may be used to provide general illumination of the area under inspection in the same manner as a flashlight.

It will be appreciated by those skilled in the art that illuminating light 40 may take various forms and that a lens may be provided to focus a beam of light from the light source or otherwise control the diameter of the spot of light that is projected onto the object under inspection. The size of the light spot may be further controlled by appropriately configuring the diameter, depth, and other dimensions of a recess in the housing in which the light source is disposed. Further, those skilled in the art will appreciate that the directionality of the transducer may be varied by also controlling the depth, diameter, and other dimensions of a recess in the housing in which the transducer is mounted. By controlling the degree of directionality of the transducer as well as the light source in this manner, it is possible to illuminate an area on the item under inspection that corresponds to the area from which the directional transducer may receive ultrasonic energy. Thus, a user may receive a visual indication of the area being inspected by viewing the diameter of the illuminated spot while moving it along the outer surface of the vessel being inspected. Further, the user could use the detector at a relatively larger distance from the inspected object until energy is detected and then move the detector closer to the object thereby reducing the dimensions of the area being inspected until the leak is pin-pointed by a small diameter illuminated spot projected by the light source.

Those skilled in the art will also appreciate that the light source may be employed in any ultrasonic detector regardless of the configuration of the circuit components. For example, the light source may be implemented in ultrasonic detectors that produce an audible signal as an indicator of the strength of the detected ultrasonic energy.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An ultrasonic detector device comprising:

a housing of a size suitable for being carried within the palm of a user's hand;

an ultrasonic transducer mounted in one end of said housing for detecting received ultrasonic energy and generating an electrical signal having an amplitude corresponding to the detected level of the received ultrasonic energy; and a light source fixedly mounted in said housing to have a fixed optical axis relative to said housing that intersects a directional axis of said ultrasonic transducer at a predetermined distance from the end of said housing for illuminating an area from which said ultrasonic transducer may detect ultrasonic energy.

2. The ultrasonic detector device as defined in claim 1 and further including an indicator light positioned on said housing and coupled to said ultrasonic transducer for receiving the electrical signal that is output from said ultrasonic transducer and for indicating a relative amplitude of ultrasonic energy received by said ultrasonic transducer.

3. The ultrasonic detector device as defined in claim 2, wherein the intensity of said indicator light varies as a function of the amplitude of the electrical signal output from said transducer.

4. The ultrasonic detector device as defined in claim 2 and further including a squelch controller coupled between said ultrasonic transducer and said indicator light for adjusting a gain of the electrical signal output from said ultrasonic transducer to said indicator light.

5. The ultrasonic detector device as defined in claim 1 and further including a detecting circuit coupled to said ultrasonic transducer for detecting when ultrasonic energy is detected by said ultrasonic transducer.

6. The ultrasonic detector device as defined in claim 5 and further including an on/off switch coupled to a power source for selectively providing power to both said light source and said detecting circuit.

7. The ultrasonic detector device as defined in claim 1, wherein said ultrasonic transducer detects ultrasonic energy emitted from a leak in a vessel regardless of the presence of the light emitted from said light source.

8. The ultrasonic detector device as defined in claim 1, wherein said light source emits a non-collimated light beam that diverges to illuminate an area of a size corresponding to that of an area from which said ultrasonic transducer detects ultrasonic energy.

9. A device for detecting a leak in a pressurized vessel, said device comprising:

a housing;

an ultrasonic transducer disposed in said housing for detecting received ultrasonic energy emanating from a leak and for generating an electrical signal having a relative amplitude corresponding to the detected level of the received ultrasonic energy;

indicator means disposed on said housing and coupled to said ultrasonic transducer for indicating the relative amplitude of electrical signal received from said ultrasonic transducer; and a non-collimated directional light source fixedly secured in said housing and supported by said housing in proximity to said ultrasonic transducer such that an optical axis of a light beam emitted by said directional light source is fixed relative to said housing and intersects a directional axis of said ultrasonic transducer at a predetermined distance from said ultrasonic transducer, wherein said light beam diverges to illuminate an area on the vessel having a size corresponding to that of an area from which said ultrasonic transducer detects ultrasonic energy.

10. The device as defined in claim 9, wherein said indicator means includes an indicator light having an intensity that varies in proportion to the relative amplitude of the electrical signal received from said ultrasonic transducer.

11. The device as defined in claim 9 and further including a squelch controller coupled between said ultrasonic transducer and said indicator means for adjusting a gain of the electrical signal output from said ultrasonic transducer to said indicator means.

12. The device as defined in claim 9 and further including a detector circuit coupled between said ultrasonic transducer and said indicators means for receiving the electrical signal generated by said ultrasonic transducer and detecting when ultrasonic energy is received by said ultrasonic transducer.

13. The device as defined in claim 12 and further including an on/off switch coupled to a power source for selectively providing power to both said directional light source and said detecting circuit.

14. The device as defined in claim 9, wherein said ultrasonic transducer detects ultrasonic energy emitted from a leak in a vessel regardless of the presence of the light emitted from said light source.

* * * * *